United States Patent [19]
Culbertson et al.

[11] Patent Number: 5,350,138
[45] Date of Patent: Sep. 27, 1994

[54] LOW-COST SHUTTLE-DERIVED SPACE STATION

[75] Inventors: Philip E. Culbertson; Thomas F. Rogers, both of McLean, Va.; Randolph H. Ware, Boulder, Colo.

[73] Assignee: University Corporation for Atmospheric Research, Boulder, Colo.

[21] Appl. No.: 31,603

[22] Filed: Mar. 15, 1993

[51] Int. Cl.$^5$ .......................... B64D 1/22; B64D 1/10
[52] U.S. Cl. .................................. 244/159; 244/158 R
[58] Field of Search ......................... 244/158, 159, 173

[56] References Cited

U.S. PATENT DOCUMENTS

| | | | |
|---|---|---|---|
| 4,792,108 | 12/1988 | Bull | 244/159 |
| 4,807,833 | 2/1989 | Pori | 244/158 R |
| 5,094,409 | 3/1992 | King et al. | 244/158 R |
| 5,217,187 | 6/1993 | Criswell | 244/158 R |

OTHER PUBLICATIONS

"Space Station" Boeing Apr. 10, 1985.
"Space Special Columbus" MBB ENRO Dec. 1989 vol. 14, No. 2.

Primary Examiner—Michael S. Huppert
Assistant Examiner—Virna Lissi Ansley
Attorney, Agent, or Firm—Duft, Graziano & Forest

[57] ABSTRACT

The space station of the present invention makes use of a modified space shuttle orbiter vehicle to provide a pre-assembled pre-tested, modular space station. The modified orbiter vehicle has all the equipment need for manned launch, re-entry and landing removed. The modified orbiter vehicle carries a pressurized laboratory module, a solar power system, and docking apparatus. The modified orbiter vehicle provides instrumentation, attitude control, communications, and life support systems. Another configuration includes an external fuel tank permanently attached to the modified orbiter vehicle. In either configuration, all equipment is fully integrated, installed and checked out on the ground before the launch in a single unmanned launch. Since the modified orbiter vehicle remains in space as a part of the space station the complexity and weight of the orbiter can be reduced by removing the systems that are required only for manned ascent, re-entry and landing, such as wings, tail, body flap, thermal protection tiles, landing gear, some of the avionics, some crew related controls, displays and hardware.

33 Claims, 13 Drawing Sheets

LOW-COST SHUTTLE-DERIVED SPACE STATION

FIELD OF THE INVENTION

This invention relates to a space station derived primarily from elements of the existing space shuttle system to create a low-cost, low-risk space station. The principal element of the shuttle-derived space station is a modified shuttle orbiter vehicle with wings, tail, thermal protection titles, landing gear, and other features needed for re-entry and landing removed. The modified "wingless" orbiter vehicle carries a pressurized laboratory module in its cargo bay and is equipped with airlock and docking ports, and a solar power system. In another configuration, the space shuttle external fuel tank is permanently attached to the modified orbiter vehicle, providing an integral framework, large pressure volumes, and attachment points for additional equipment. Either configuration can be fully outfitted on the ground and then launched in a single unmanned launch to create a fully capable space station with life support, communications, electrical power, heat radiators, and attitude control. The configuration with the attached external tank provides additional capability.

PROBLEM

It is a problem in the field of space exploration to transport the necessary materials into earth orbit to assemble a space station,. The cost of lifting materials into earth orbit is on the order of $5,000/lb., and the cost of assembling a manned space station of even moderate size therefor represents a significant financial investment. There have been numerous patents and publications directed to finding low-cost solutions to the problem of transporting sufficient resources into earth orbit to enable the assembly of a manned space station capable of supporting human life for a number of astronauts for an indefinite period of time.

One such space station is illustrated in U.S. Pat No. 4,807,833, which discloses a combined space vehicle fuel cell and space station structural building component. This modular space station structural building component makes use of the space craft external fuel tank, which tank is configured so that a first pressure vessel contained therein is capable of containing one of the propellants required to propel the space craft during liftoff. This first pressure vessel is preferably positioned forward of a second pressure vessel that is used to contain a second propellant that is used to propel the space craft during liftoff. An intervessel structure is included in the external fuel tank to interconnect the two pressure vessels. The intervessel structure is lightweight due to the configuration of the pressure vessels and is preferably concentrated in the aft end of the forward fuel tank for providing a rigid structure that receives thrust generated by the rocket engines that are attached to the space craft. This fuel tank configuration results in a lower center of gravity, which improves stability when thrust is applied to the space craft. A docking structure is incorporated into the modular space station building component for connection to other similar fuel tanks after orbit is achieved, to thereby construct a space station using a plurality of the fuel tanks in a ring arrangement. Equipment that is not susceptible to damage through contact with the one propellant can be preinstalled in the fuel tank's first pressure vessel to alleviate the need to install such equipment after orbit is achieved thereby reducing the payload requirements of tile space craft to construct the space station. In one embodiment disclosed in this patent, a storage compartment is included in the intervessel structure to carry additional payload above and beyond that carried by the space craft.

While this configuration provides a very large pressurized volume in space, it suffers from a number of limitations, a primary one of which is that due to the fact that the pressure vessels are used to contain propellant (liquid oxygen and liquid hydrogen) during the launch phase of operation, the extent to which space station systems, such as life support, guidance, communication, scientific and other instrumentation, can be installed prior to launch is extremely limited. Therefore, once the modular space station building component has been placed in orbit, all the necessary life support, communications and laboratory equipment must then be transported to the modular space station building component by means of a plurality of other launches, each of which transports necessary space station equipment in its cargo hold. This equipment must then be transported from the space craft to the modular space station building component via an external hatch. In many cases, the anticipated size and complexity of this equipment requires extra vehicular activity (EVA) to accomplish the equipment transfer. Furthermore, the installation, integration and testing of the various required equipment is much more difficult to accomplish in orbit compared to similar operations conducted before launch. In addition, providing access ports on the modular space station building component of sufficient size to allow the transportation of equipment subassemblies of significant complexity and size must be done with great care and testing, since the structural integrity of the fuel tank cannot be compromised by the provision of access ports or by any other structural modification.

SOLUTION

The above-described problems are solved and a technical advance achieved in the field by the low-cost shuttle-derived space station of the present invention. This space station overcomes the problems of prior space station designs by making use of a modified space shuttle orbiter vehicle, with or without an attached external fuel tank, to provide a preassembled, pretested, modular space station. The principal element of the shuttle-derived space station is a modified shuttle orbiter vehicle with wings, tail, thermal protection tiles, landing gear, and other features needed for re-entry and landing removed. The cargo bay of the modified "wingless" orbiter carries a pressurized habitable laboratory module. The modified orbiter vehicle is also outfitted with a folded photovoltaic array that converts sunlight into electrical power, and airlock and docking ports to provide for crew exchange, transfer of equipment and materials and extra vehicular activity. In addition, the space shuttle external fuel tank may be permanently attached to the modified orbiter vehicle and carried into orbit. The modified orbiter vehicle alone, or with external tank attached, can be launched into orbit in a single unmanned launch. The external tank, if attached, provides an integral framework, large pressure volumes, and attachment points for modules and other equipment to be attached after the orbiter-tank combination are in orbit.

The present Space Transportation System (space shuttle) is a space vehicle in which a number of the components are used again and again in launches from the earth. The space shuttle is comprised of an orbiter vehicle having a set of main rocket engines and which transports the crew and payload. A large external fuel tank is detachably connected to the space shuttle orbiter vehicle and the external tank contains two propellants used as fuel and oxidizers for the main engines of the orbiter vehicle. Two solid fuel rocket boosters are also connected to the external tank to provide additional thrust during liftoff. The external tank not only carries the liquid fuels that power the main engines of the orbiter vehicle, but also serves as an integral framework to support the solid fuel boosters and the orbiter vehicle during the launch. The orbiter vehicle and the solid fuel rocket boosters are reusable, but the external fuel tank is discarded after each launch. The space shuttle is launched by a combination of the space shuttle orbiter vehicle main engines, fueled by combustion of liquid oxygen and liquid hydrogen, and the solid fuel rocket boosters, fueled by a solid propellant. Liquid propellants for the orbiter vehicle main engines are carried in the external tank. At launch, both the main engines and the solid fuel rocket boosters are concurrently ignited, accelerating the space shuttle to a speed of Mach 1 in 50 seconds. The solid fuel rocket boosters consume their propellant about 2 minutes, 10 seconds after ignition, by which time the space shuttle has reached a speed of Mach 4.5 and an altitude of 28 miles. The solid fuel rocket booster casings separate from the external tank and are recovered by use of a parachute system which provides a controllable descent of the rocket booster casings into the ocean from which they are subsequently recovered and reused. The orbiter vehicle proceeds under power of the main engines to an altitude of about 70 miles at which point the main engines are shut down. Twenty seconds later, the external tank is separated from the orbiter vehicle. The external tank remains in orbit for 30 to 60 minutes before descending over open ocean, breaking up and burning during reentry. The orbiter vehicle is then powered into orbit by smaller onboard orbital maneuvering system engines.

The modular space station of the present invention makes use of a modified orbiter vehicle to provide instrumentation, attitude control, communications and life support systems. A pressurized habitable laboratory module is carried in the cargo bay of the modified orbiter. The modified "wingless" orbiter also carries a foldable photovoltaic array that can be unfolded in orbit to provide conversion of sunlight to electricity. The photovoltaic array may be carried in the cargo bay or otherwise folded and stowed aboard the modified orbiter vehicle. This comprises the first configuration. In a second configuration, attached to the modified orbiter vehicle is an external fuel tank that has been outfitted with docking ports and a pressurized access tunnel interconnecting the orbiter vehicle with the external tank. Either configuration can be fully outfitted and tested on the ground before launch to orbit in a single unmanned launch. Since the modified orbiter vehicle remains in space, its complexity and weight can be reduced by removing the systems that are required only for manned ascent, reentry and landing, such as wings, tail, body flap, thermal protection tiles, landing gear, some of the avionics, and some crew related controls, displays and hardware. Weight reductions of 20 to 50 thousand pounds can be obtained from these deletions and provide increased available effective payload and performance. In addition, the cargo bay of the orbiter vehicle can be used to transport additional equipment such as a laboratory module and/or habitat. All equipment is fully integrated, installed and checked out on the ground before the orbiter vehicle is launched. The laboratory module can be heavier and longer than is possible in a standard shuttle orbiter vehicle because of system deletions and since the center of gravity limitation at landing does not apply to the modified orbiter. A deployable solar panel system can also be carried in the orbiter vehicle to provide power to the space station. Many of the existing systems and capabilities of the shuttle orbiter vehicle are fully utilized in the space station. The carbon dioxide removal system and the environmental control system can be retained or modified to improve operational lifetime and efficiency. Data management and communication systems of the orbiter vehicle can be used for the space station and the shuttle orbiter vehicle air lock is retained as either the prime or backup mode of performing extra vehicular activity (EVA) along with all the necessary pressure suit functions. The communication antennas built into the shuttle orbiter vehicle are used for wide band communication and the thermal radiators mounted on the cargo bay doors provide heat rejection capability for the space station. The existing remote manipulator system can be retained and used in berthing other space craft or instruments or space station additions, The remote manipulator system can also be used for maintenance and repair tasks.

Within the external tank are located separate hydrogen and oxygen pressure vessels separated by an unpressurized 5,000 cu ft. of intertank section. The intertank section is outfitted with docking ports and airlocks interconnected by pressure tunnels. Docking pores can accommodate visiting orbiters, crew escape and rescue vehicles, additional laboratory modules, or other equipment. The tunnel system provides access to the orbiter vehicle crew compartment. The pressure tunnels in the intertank section are constructed of inflatable ruggedized fabric material that can be pressurized in orbit. The pressure tunnels also are connected to each of two 3-ft. diameter manhole ports that provide access to the oxygen and hydrogen pressure volumes. The oxygen and hydrogen tank domes extend into the central region of the intertank space and are not designed to accept an inward differential pressure. Therefore, the pressure tunnels are designed to allow the dome surfaces and outer cylindrical hull to remain unpressurized. During launch, the pressure tunnels are vented to eliminate any possible back pressure to the existing tank domes. After reaching orbit, the vents are closed and the tunnels are pressurized. Both of the large external tank fuel vessels have manhole covers accessible from the intertank volume and can be converted to useful pressurized habitable space to supplement that provided by the pressurized tunnels, the attached orbiter and its payload. Thus, the orbiter vehicle with the external tank integrally attached thereto by means of pressurized transfer tunnels and docking ports can be launched in an unmanned mode in a single flight to provide a very capable, preassembled, pretested and low-cost space station.

DETAILED DESCRIPTION

Figure 4:
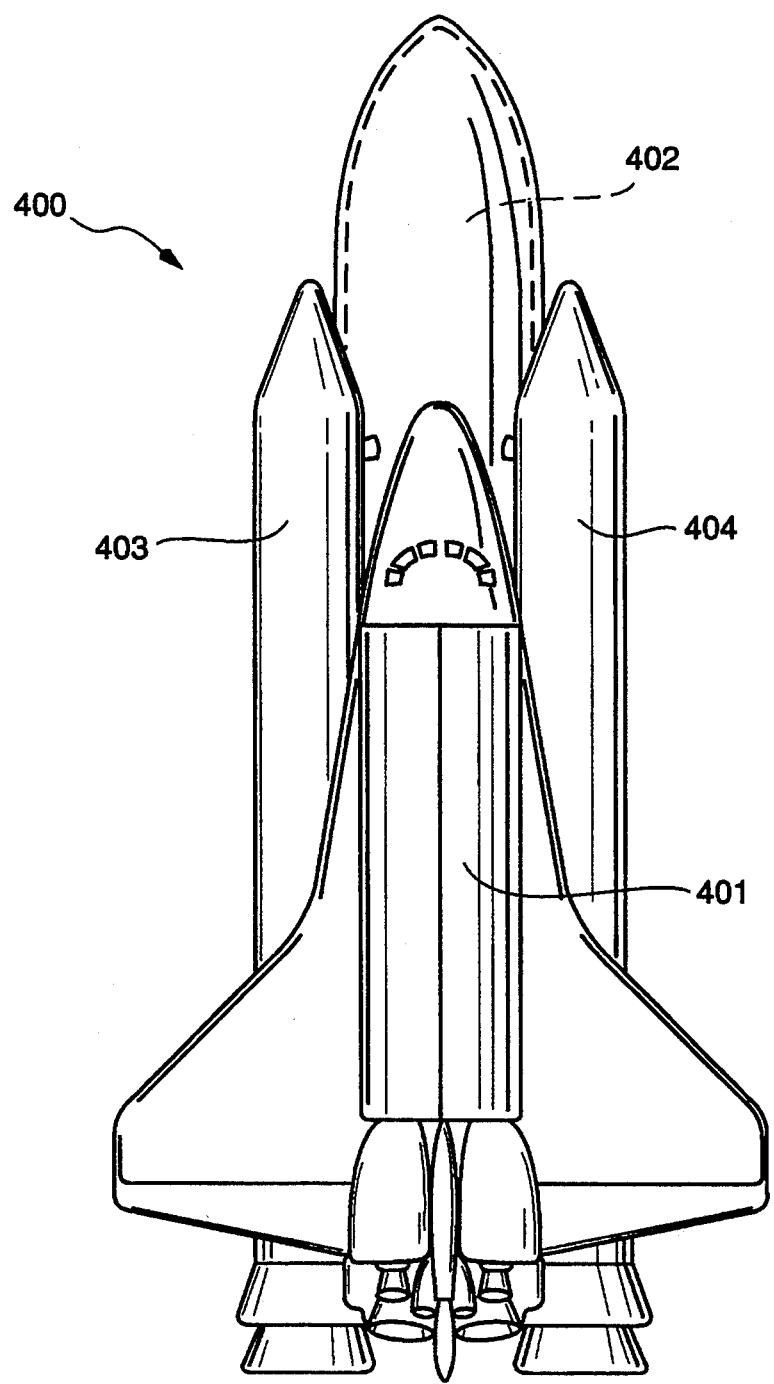
FIG. 4 illustrates a typical configuration of the space shuttle system.
Figure 5:
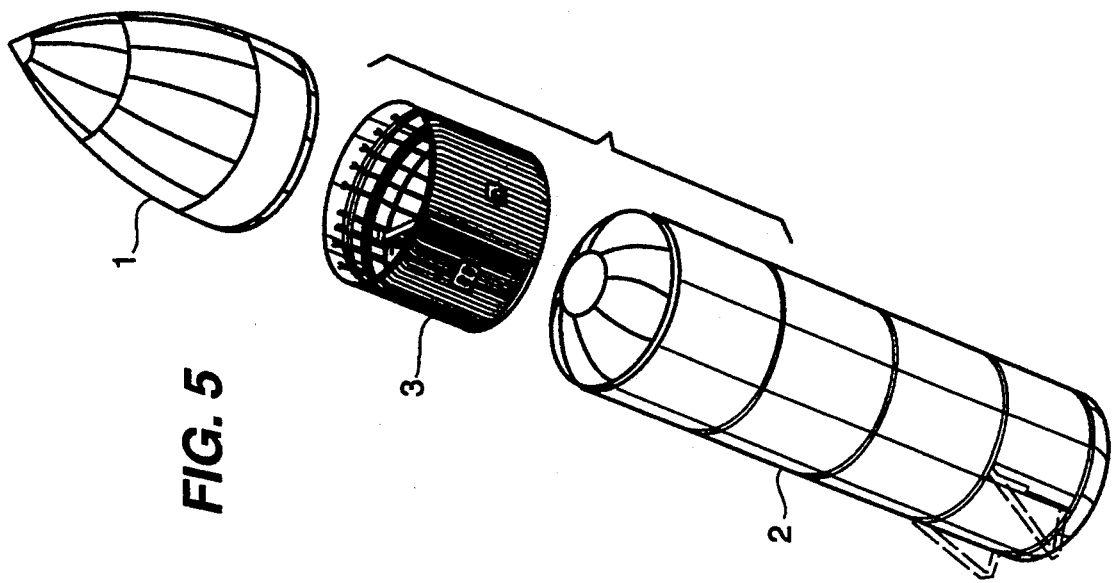
FIG. 5 illustrates an exploded view of the space shuttle external tank.

FIG. 4 illustrates the configuration of the present Space Transportation System also known as the space shuttle 400. The space shuttle 400 is a combination of several components, one of which is an orbiter vehicle 401 that resembles an airplane and which carries the crew and payload. An external fuel tank 402 is also provided as are two solid fuel rocket boosters 403,404. In this configuration, the large cylindrical external fuel tank 402 is positioned in the center of the space shuttle 400 with the two cylindrical solid fuel rocket boosters 403,404 located on opposite sides of the external tank 02. The orbiter vehicle 401 is located parallel to the linear array of the two solid fuel rocket boosters 403, 404 and the external tank 402. The external tank 402, as illustrated in exploded view in FIG. 5, is composed of a forward pressure vessel 1 for containment of the liquid oxygen fuel and a large aft pressure vessel 2 for containment liquid hydrogen fuel. The two pressure vessels 1, 2 are joined together by an unpressurized heavy cylindrical intertank structure 3. The two solid fuel rocket boosters 403, 404 are attached to the external tank 402 so that the thrust generated by these solid fuel rocket boosters 403, 404 is transmitted to the cylindrical external tank structure from two forward attachments systems (element 5 in FIG. 6). The aft attachment systems (not shown) of the solid fuel rocket boosters 403, 404 are hinged to the rear wall of the external tank 402 so as to provide lateral rigidity only and do not function to transmit the thrust of the solid fuel rocket booster motors to the external fuel tank 402. The orbiter vehicle 401 is connected to the external tank 402 fore and aft, with the forward attachment to the external tank 402 being to the cylindrical intertank structure 3 and hinged for lateral rigidity only so as not to receive the thrust from the orbiter vehicle's main engines. The aft 30 attachment of the orbiter vehicle 401 to the external tank 402 is rigid and transmits the thrust of the orbiter vehicle's main engines. The space shuttle 400 is launched by a combination of space shuttle main engines, fueled by combustion of liquid oxygen and liquid hydrogen, and the solid fuel rocket boosters 403, 404 which are fueled by solid propellant. At launch, both the main engines and the solid fuel rocket boosters 403, 404 are concurrently ignited to accelerate the space shuttle 400. The solid fuel rocket boosters 403, 404 consume their propellant about two minutes, 10 seconds after ignition, and the booster casings are separated from the space shuttle 400 by explosive charges. Small solid rocket motors (not shown) can be used to move the booster housings away from the external tank 402. A parachute is deployed from each booster casing so as to allow the recovery of the booster casings for reuse. When the space shuttle orbiter vehicle 401 reaches a predetermined altitude and velocity, the main engines are shut off and the attachments of the external tank 402 to the orbiter vehicle 401 are explosively severed to allow the external tank 402 to be discarded. The external tank 402 falls from orbit, descending over open ocean and breaking up and burning during reentry. The orbiter vehicle 401 is then powered into orbit by smaller onboard orbital maneuvering system engines.

Space Station Architecture

Figure 1:
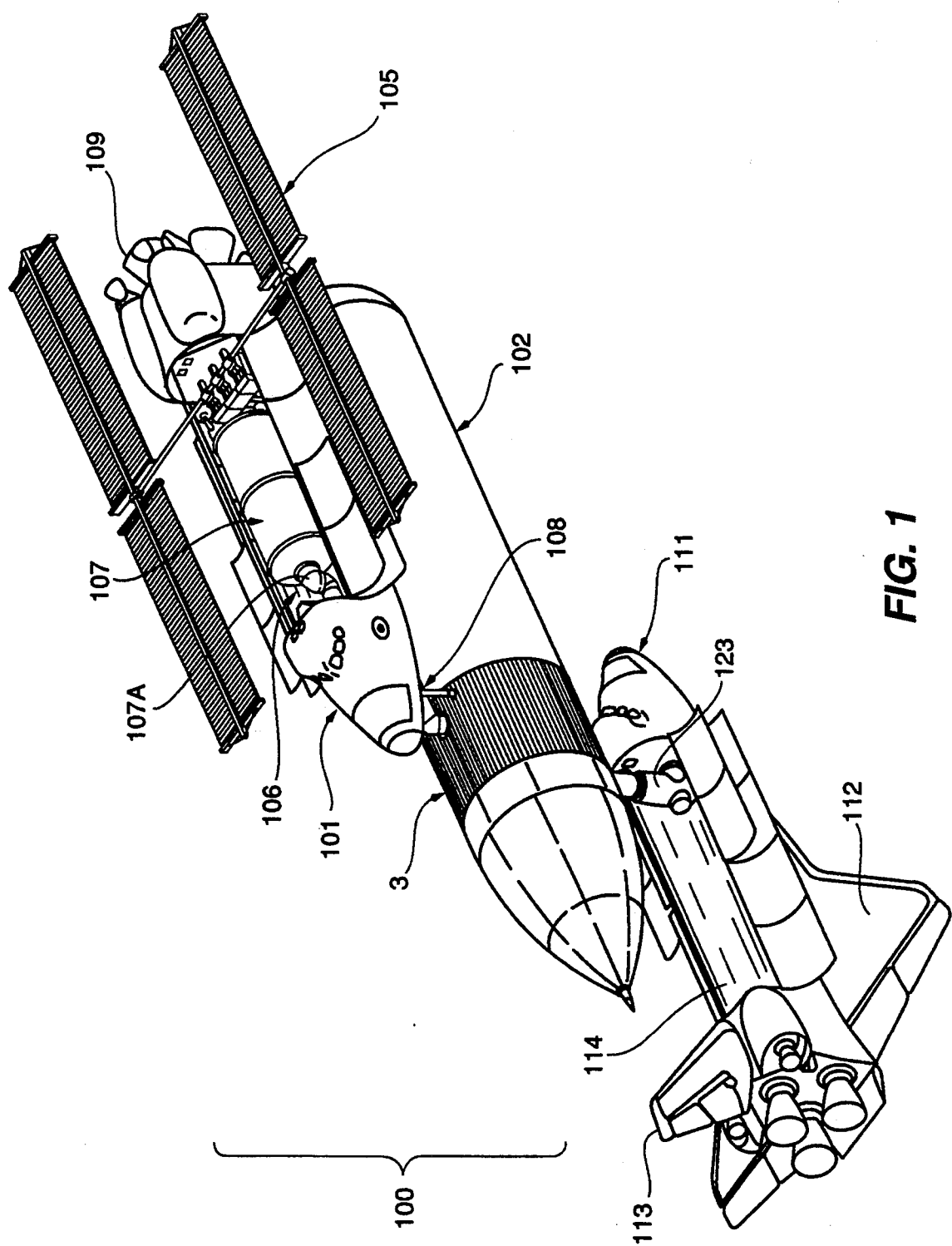
FIG. 1 illustrates the space station of the present invention in perspective view.
Figure 2:
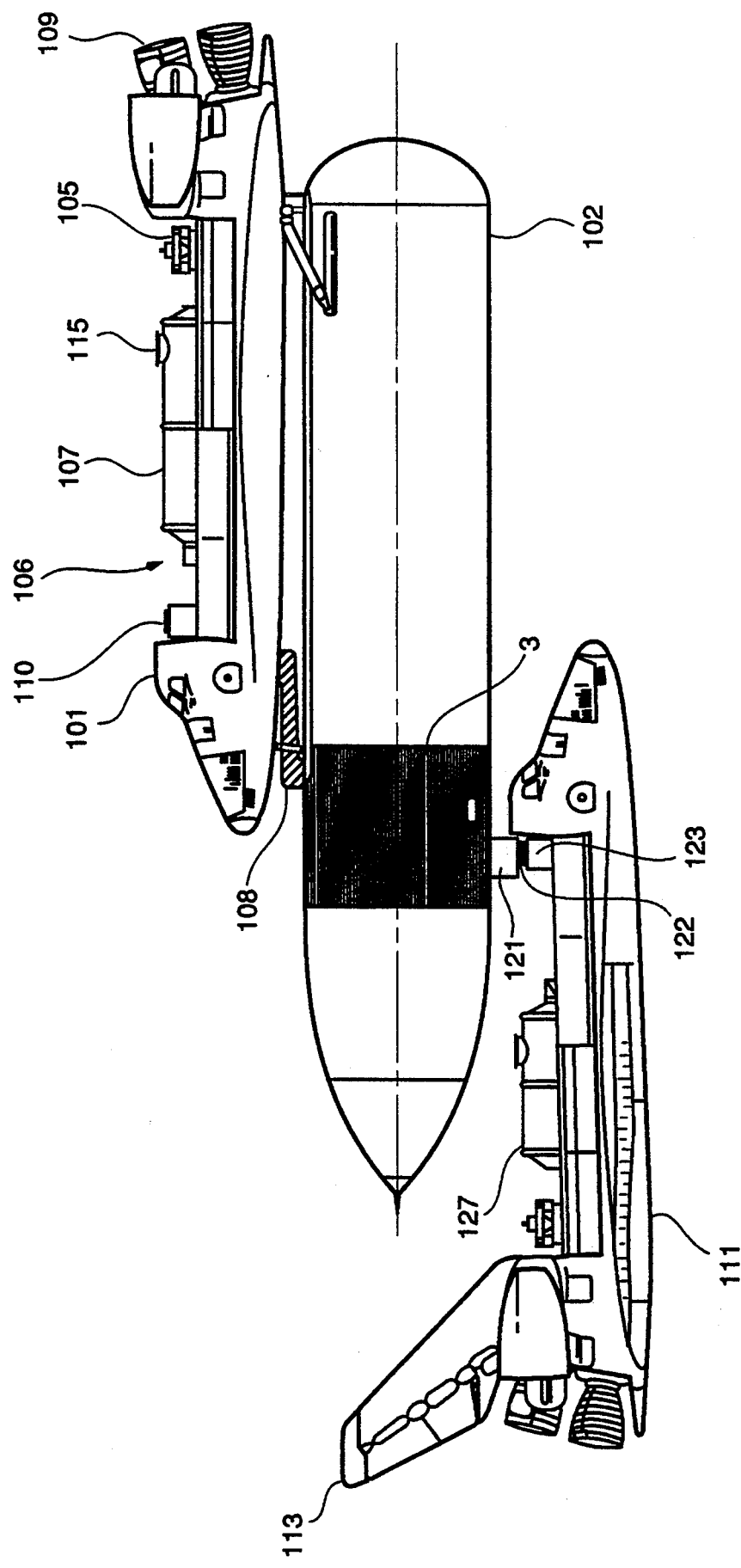
FIG. 2 illustrates a side view of the space station of the present invention.
Figure 3:
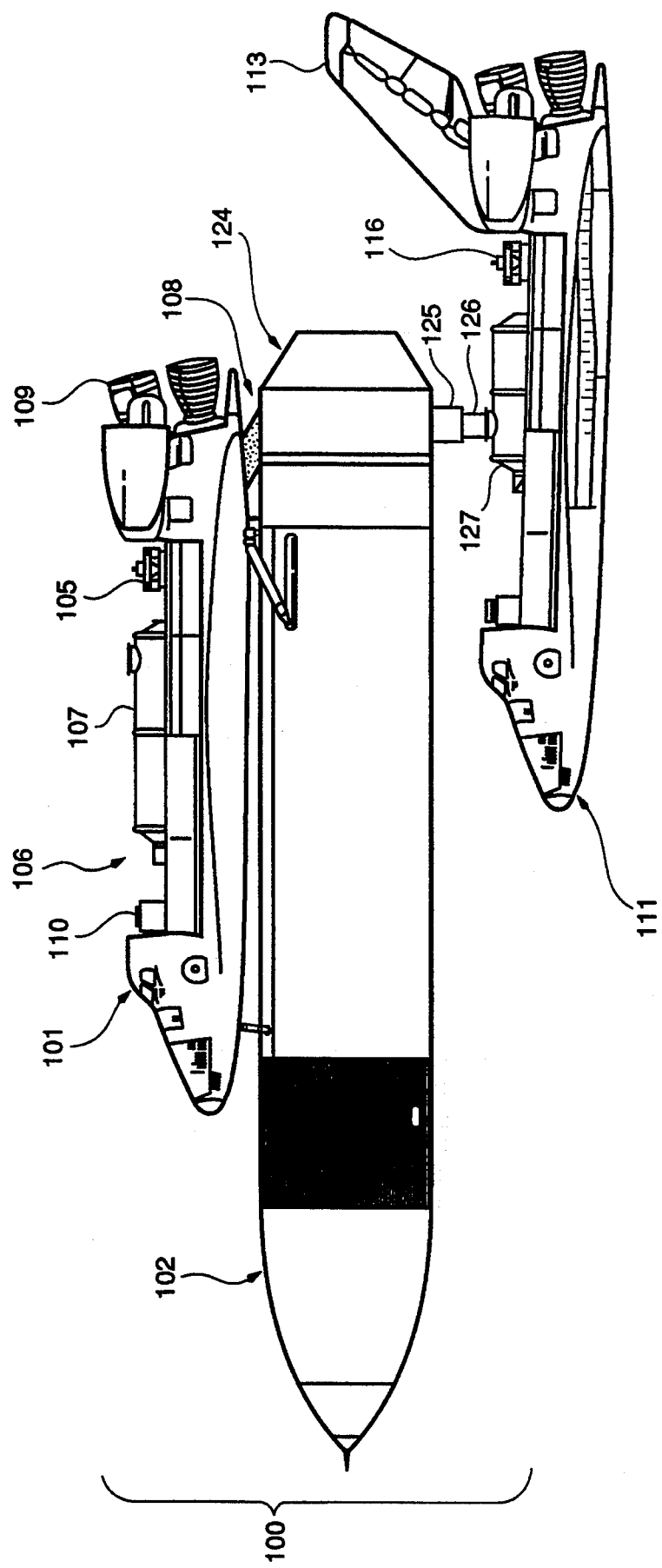
FIG. 3 illustrates a side view of an alternate embodiment of the space station of the present invention.

FIGS. 1–3 illustrate in perspective view, side view and alternate embodiment side view, respectively, the modular space station 100 of the present invention.

The modular space station 100 of the present invention makes use of an external fuel tank 102 that has been outfitted with docking ports as an anchorage. A pressurized access tunnel 108 interconnects that orbiter vehicle 101 with the external tank 102. The orbiter vehicle 101 is an integral part of the space station 100 and remains connected to the external tank 102 to supply the instrumentation, attitude control, communications and life support systems for the habitable space contained within the external tank 102. Since the orbiter vehicle 101 remains in space as part of the space station 100, the complexity and weight of the orbiter vehicle 101 can be reduced by removing the systems that are required only for manned ascent, re-entry and landing, such as wings, tail, body flap, thermal protection tiles, landing gear, some of the avionics, some crew related controls, displays and hardware. An alternative configuration of the modular space station makes use of the "wingless" orbiter vehicle 101 that is equipped with a habitable, pressurized laboratory 107 in its cargo bay 106, without retention of external tank 102 as additional habitable space. For the purpose of simplicity, the orbiter vehicle/external tank 102 configuration is described in additional detail although it is to be understood that external tank 102 is not an essential component for the "wingless" orbiter vehicle 101.

Included in FIG. 1 is illustrated a visiting orbiter vehicle 111 that is fully equipped with wings, tail, landing gear, etc. for conventional space shuttle missions, which include an ascent as well as s controllable descent. As can be seen from this diagram, the orbiter vehicle 101 of the modular space station 100 is not equipped with wings or a tail as is the visiting orbiter vehicle 111. The space station orbiter vehicle 101 can be equipped with deployable solar panels 105 that are stored during the ascent in the orbiter vehicle cargo bay 106 as is conventionally known in space shuttle technology. Also included in the cargo bay 106 is a laboratory structure 107 that provides habitable space consisting of a pressurized chamber that is accessible via a pressurized transfer tunnel 107a to the crew quarters of the orbiter vehicle 101. The phrase "habitable space" is used to describe a volume, regardless of its use, that can be occupied by crew members in a "shirt sleeve" mode, without the necessity of using individual life support equipment. Thus, habitable space includes crew quarters, tunnels, laboratory space, etc. The orbiter vehicle 101 is equipped with modified life support, communications, crew quarters, power and attitude control capabilities of a conventional space shuttle orbiter vehicle 401/111. In FIG. 1, a pressurized transfer tunnel 108 is provided to interconnect the orbiter vehicle 101 with the intertank space 109 of the external tank 102. A pressure lock and hatch are included to interface pressurized transfer tunnel 108 with the crew space in orbiter vehicle 101.

External tank 102 functions as an anchorage for both orbiter vehicle 101 and visiting orbiter 111. External tank 102 also provides a buffer between orbiter vehicle 101 and visiting orbiter 111, to absorb the force of impact should the visiting orbiter 111 collide with external tank 102 during the docking procedure. External tank 102 also absorbs the impact of any space debris, meteorites, etc. thereby functioning as a shield for orbiter vehicle 101.

As noted, external tank 102 is equipped with a plurality of docking ports that enable a plurality of modules or other equipment to be interconnected with the space station 100. The primary mode of attachment is at the intertank space 3. FIG. 1 illustrates a typical intertank space docking configuration, wherein visiting orbiter vehicle 111 is coupled to space station 100. The visiting orbiter vehicle 111 is equipped with wings 112 and tail 113 to enable it to proceed with reentry and landing upon completion of its mission. To avoid the possibility of tail 113 coming into contact with external tank 102, visiting orbiter 111 is docked nose-to-nose with external tank 102. Visiting orbiter 111 is equipped with a docking port 123 in cargo bay 114 to enable the crew space of visiting orbiter 111 to be interconnected with intertank space 3 of external tank 102.

Side View of Alternative Embodiments

FIGS. 2 and 3 illustrate side views of two embodiments of the space station architecture. FIG. 2 shows the visiting orbiter vehicle 111 carrying a space lab module 127 in cargo bay 114 docked at one of the docking ports 121 of the intertank space 3, with the visiting orbiter 111 being connected by a pressurized docking tunnel 122 that interconnects the intertank space 3 with an extravehicular access port 123 located juxtaposed to the crew space in the visiting orbiter vehicle 111.

It should also be noted that the laboratory module 107 of orbiter vehicle 101, shown in FIG. 2, includes a docking port 115 located at the end of laboratory module 107 proximate main engines 109. This additional docking port 115 provides another point of connection of space station 100 with additional equipment or modules (not shown). The orbiter vehicle 101 is also equipped with docking port 110 that is the same as docking port 123 shown on visiting orbiter 111.

The alternate embodiment of FIG. 3 provides an additional payload capability to external tank 102 by the addition of an aft cargo carrier 124 at the tail end of external tank 102. The aft cargo carrier 124 is pressurized and can include docking ports 125, one of which is shown connected via pressurized tunnel 126 to a laboratory module 127 in a visiting orbiter vehicle 111. Visiting orbiter vehicle 111 is also equipped with solar collectors 116 to supplement those provided in orbiter vehicle 101. There are numerous possible variations and combinations of docking configurations and those illustrated in FIGS. 2 and 3 are for illustrative purposes only.

External Tank Structure

Figure 8:
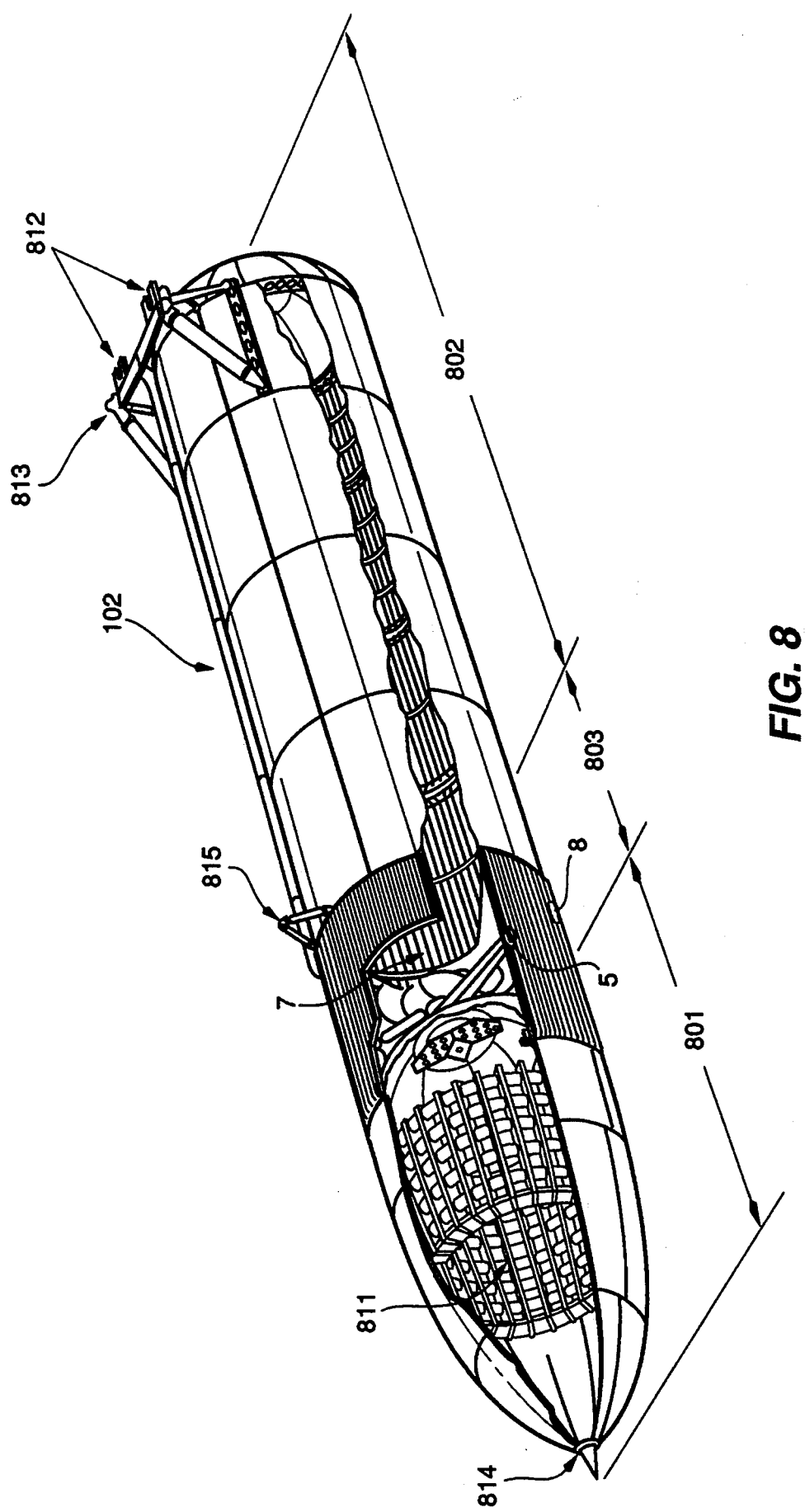
FIG. 8 illustrates a cutaway view of the space shuttle external tank.

FIG. 8 illustrates a cutaway view of the external tank 102 to illustrate the internal structure found in a typical external tank 102. The approximate dimensions of an external tank 102 are length of 168.5 ft. and a diameter of 27.2 ft., representing a total volume of approximately 78,000 cu. ft. The forward segment 801 of the external tank 102 consists of a pressurized vessel for containment of the liquid oxygen. This pressurized vessel is equipped with liquid oxygen slosh baffles 811 to ensure a steady even flow of liquid oxygen from the pressurized vessel to the propellant feed lines which are carried within the external tank 102 to the propellant feed pressurization lines and electrical umbilical fixtures 812 located at the orbiter aft attachment apparatus 813. A liquid oxygen vent valve 814 is provided on the nose of the external tank 102. The liquid oxygen tank 801 is approximately 27.2 ft. in diameter, 49.3 ft. in length and represents a usable volume of 19,500 cu. ft. The liquid hydrogen tank 802 is installed in the aft section of the external tank 102 and is of length 96.7 ft. representing a usable volume of 53,500 cu. ft. As with the liquid oxygen tank 102, propellant feed lines from the liquid hydrogen tank terminate on the orbiter aft attachment apparatus 813. Also illustrated in FIG. 8 is the orbiter forward attachment fixture 815 that prevents lateral movement of the orbiter vehicle 101 on the external tank 102 during the launch process. The intertank section 803 is of length 22.5 ft. and represents a usable volume of approximately 5,000 cu. ft. The intertank space is vented to the atmosphere, reaching near vacuum as the shuttle reaches orbital altitude.

Intertank Structure

Figure 7:
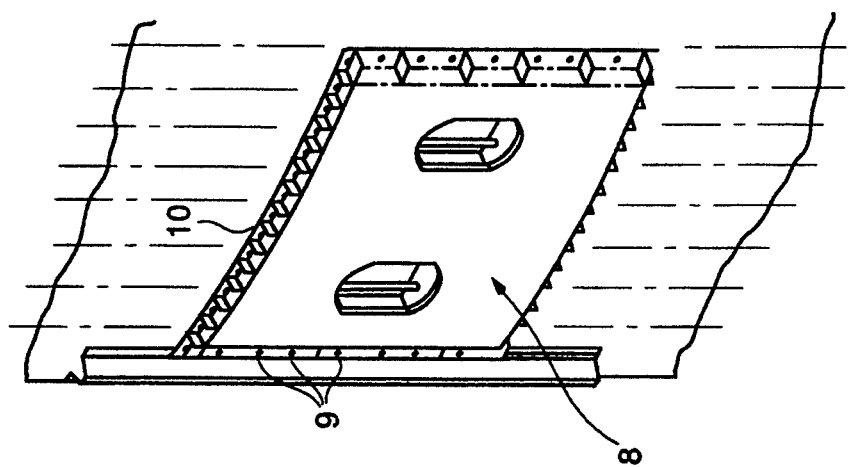
FIG. 7 illustrates a perspective view of the intertank access door.
Figure 6:
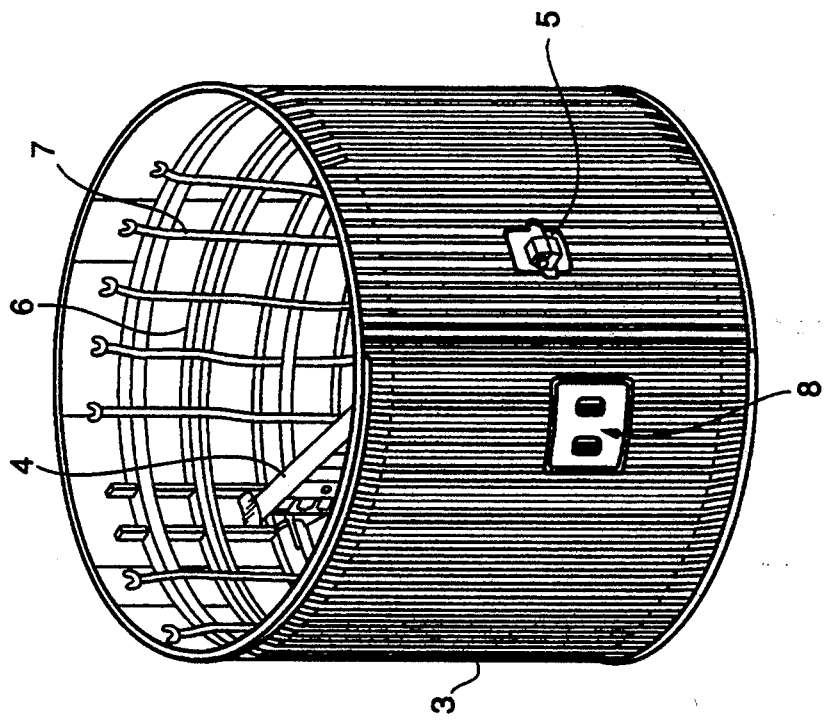
FIG. 6 illustrates a perspective view of the intertank.

FIG. 6 is a perspective view of the intertank structure 3 which functions as the connecting segment between the liquid oxygen propellant tank 1 and the liquid hydrogen propellant tank 2 of external tank 102. The intertank structure 3 includes a large box beam 4 that extends from one side of the intertank structure 3 to the other, and is terminated at each end thereof with a solid fuel rocket booster fitting 5. Structural strength for the intertank structure 3 is provided by annular ring frames 6 and longitudinal stringers 7. In FIG. 7, the intertank structure door 8 is a hatch that is used to access the intertank space prior to launch. Intertank structure door 8 is secured to the intertank structure 3 by a series of bolts 9 and a seal 10 cushions the intertank structure door 8 during flight.

Figure 9:
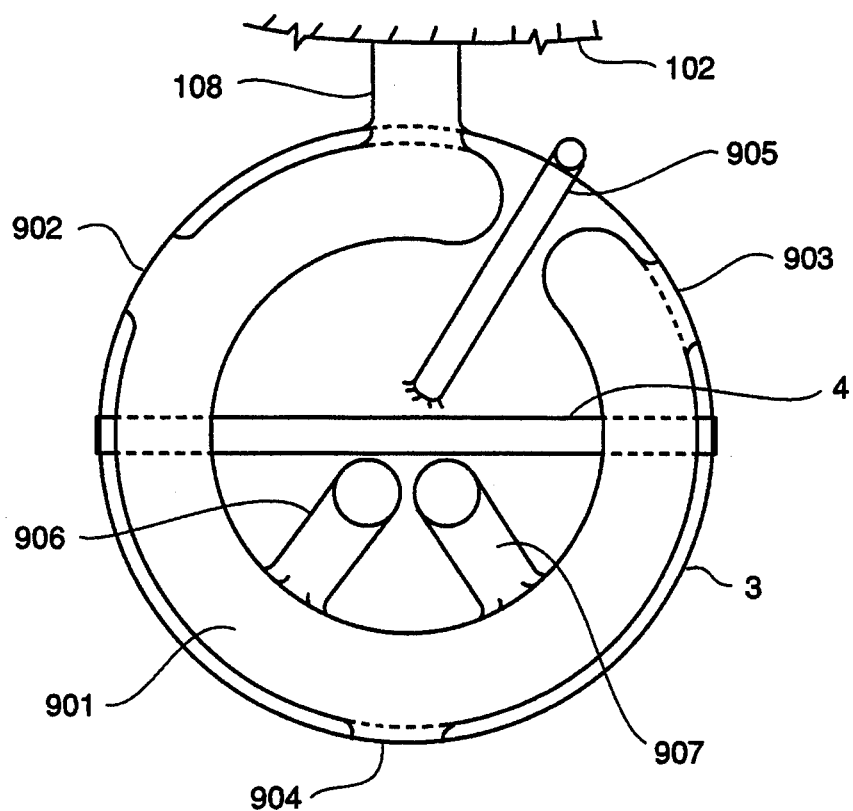
FIGS. 9–13 illustrate additional details of the pressurized inflatable transfer tunnel that interconnects the space shuttle vehicle and the external tank, as well as intertank transfer tunnel details.
Figure 10:
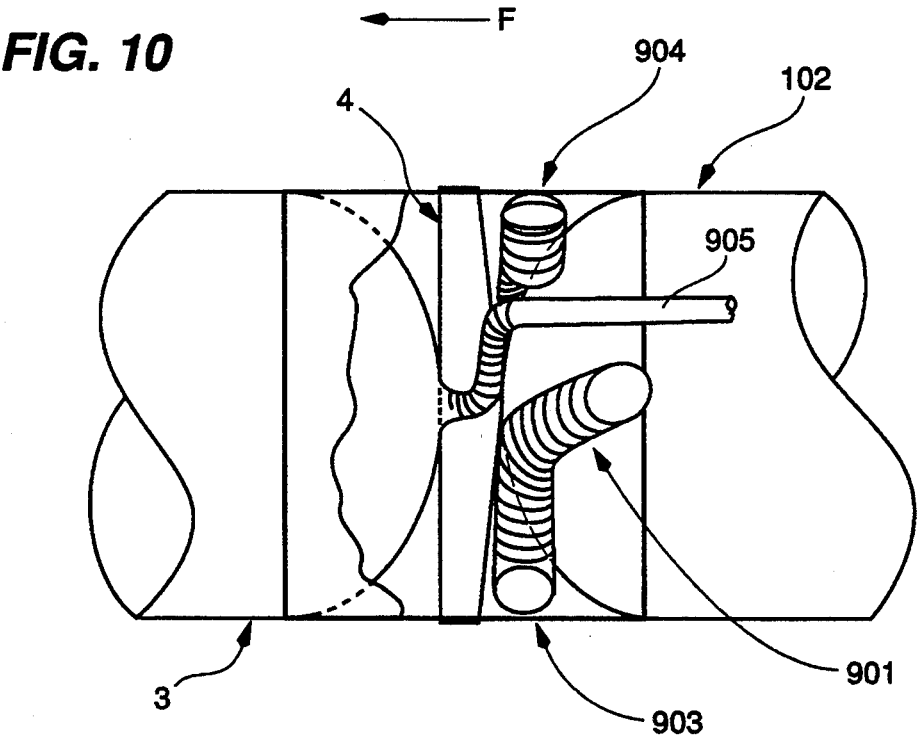
Figure 11:
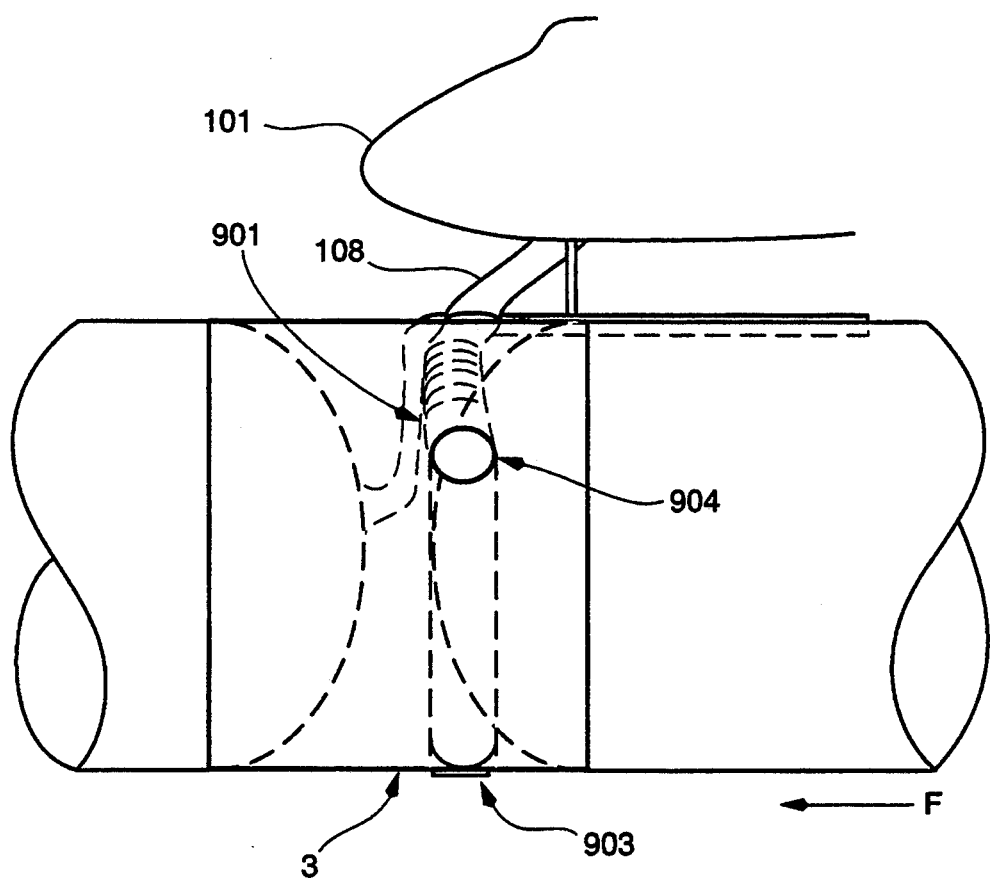
Figure 12:
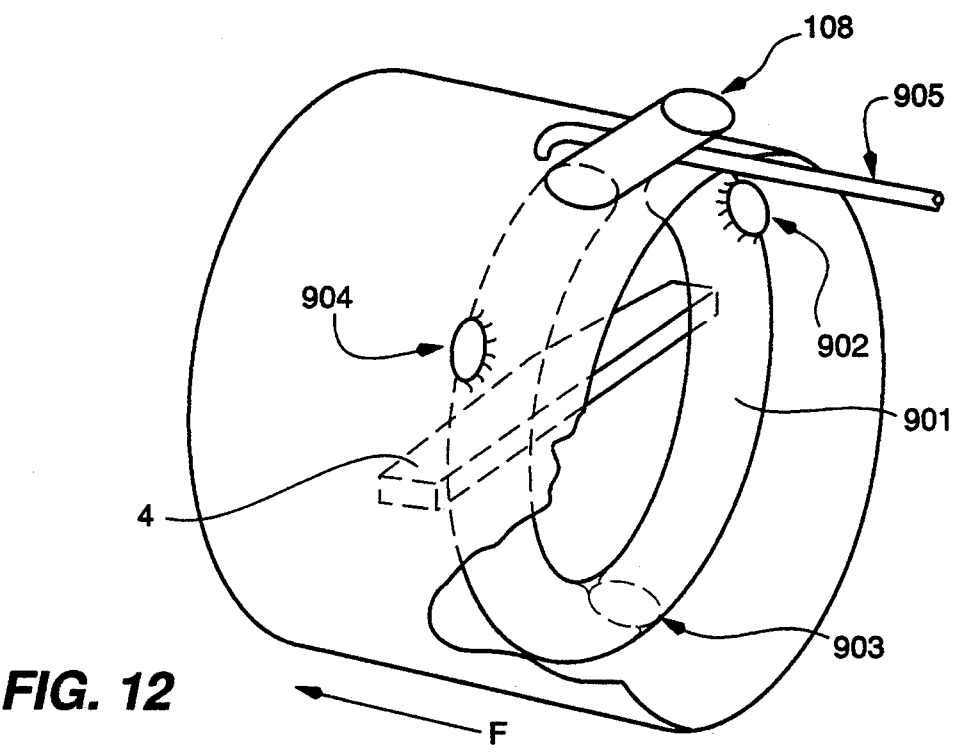
Figure 13:
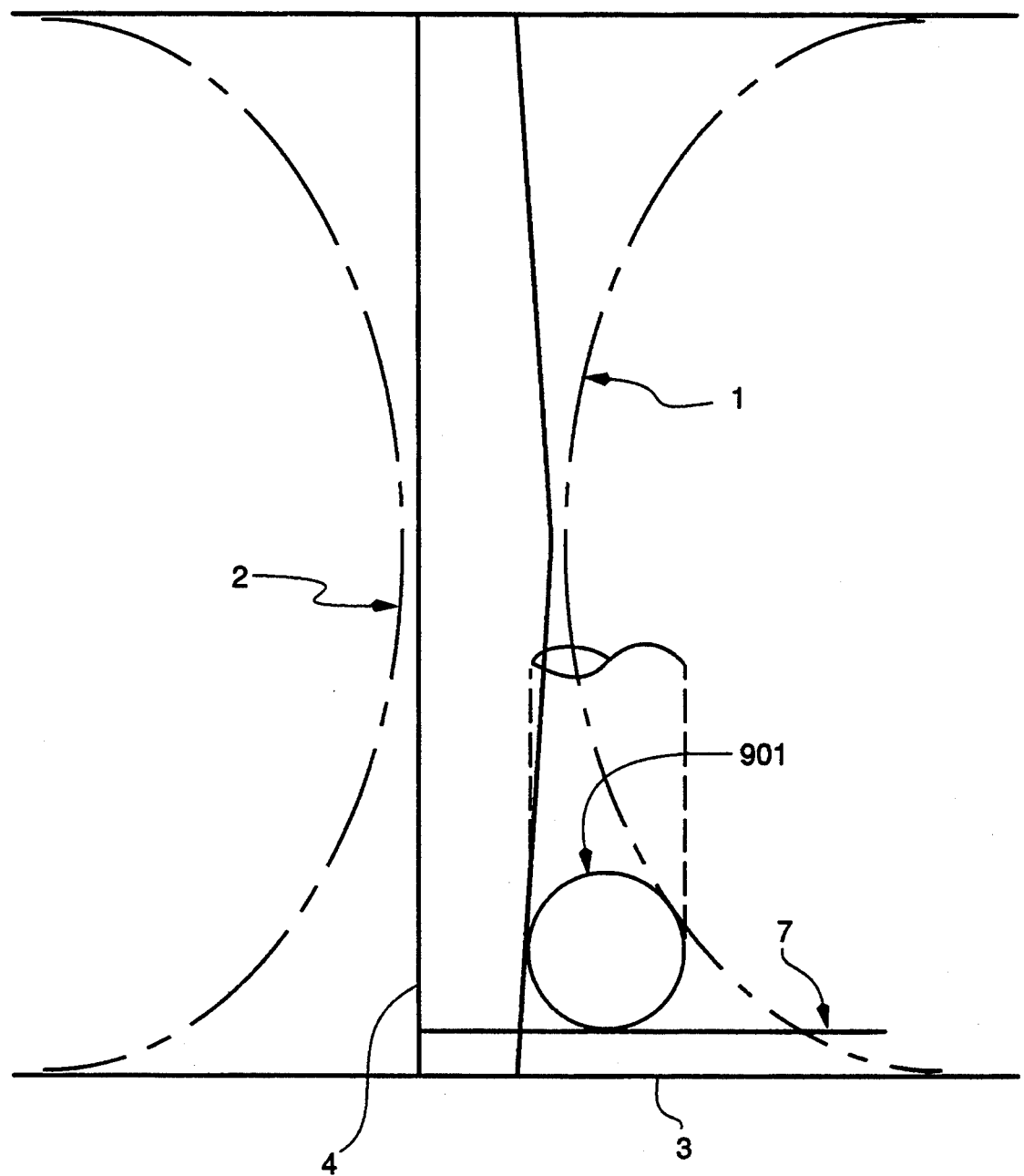
Figure 16:
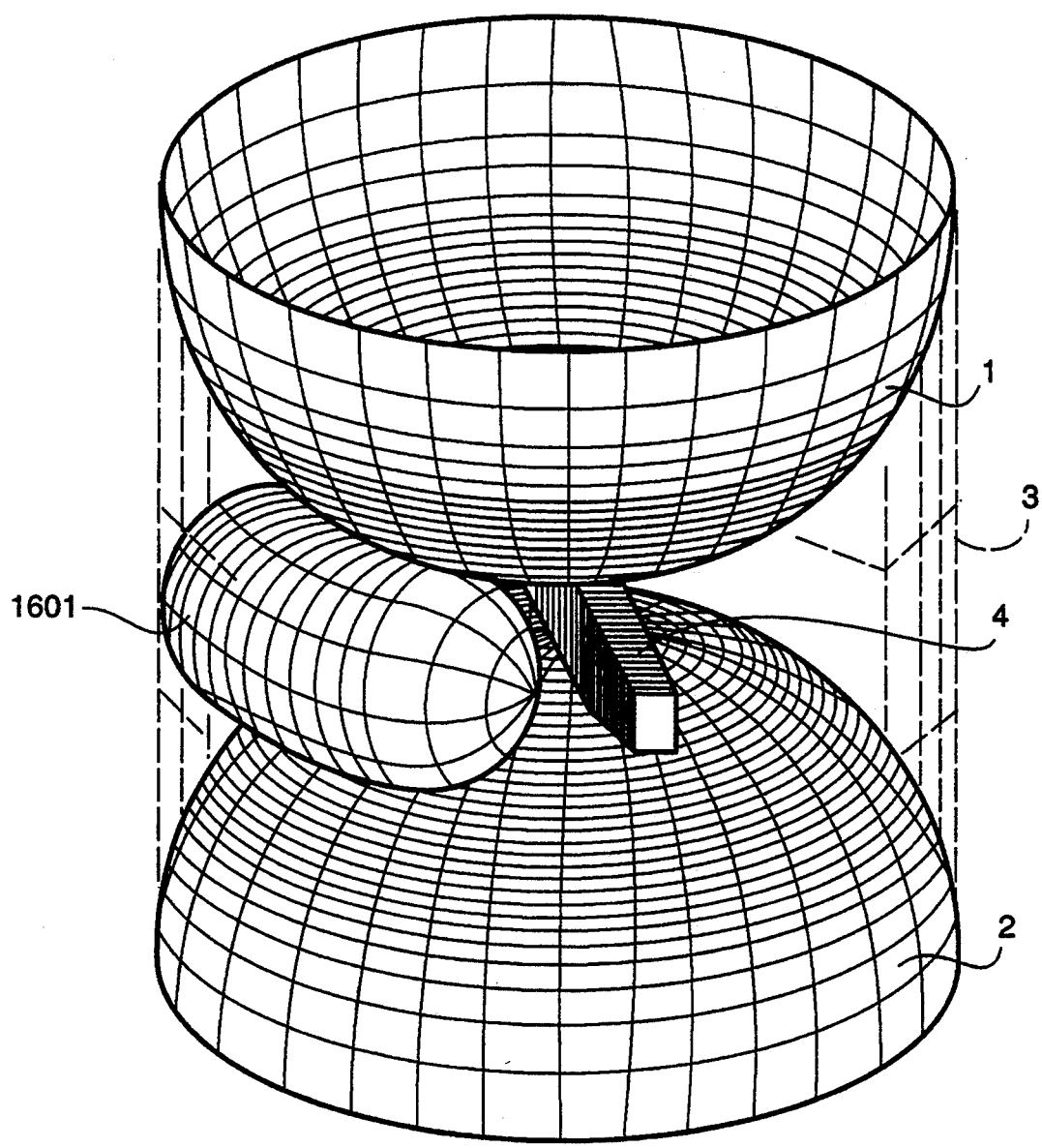
FIGS. 16 and 17 illustrate a perspective view of the intertank containing an inflatable habitable space.
Figure 17:
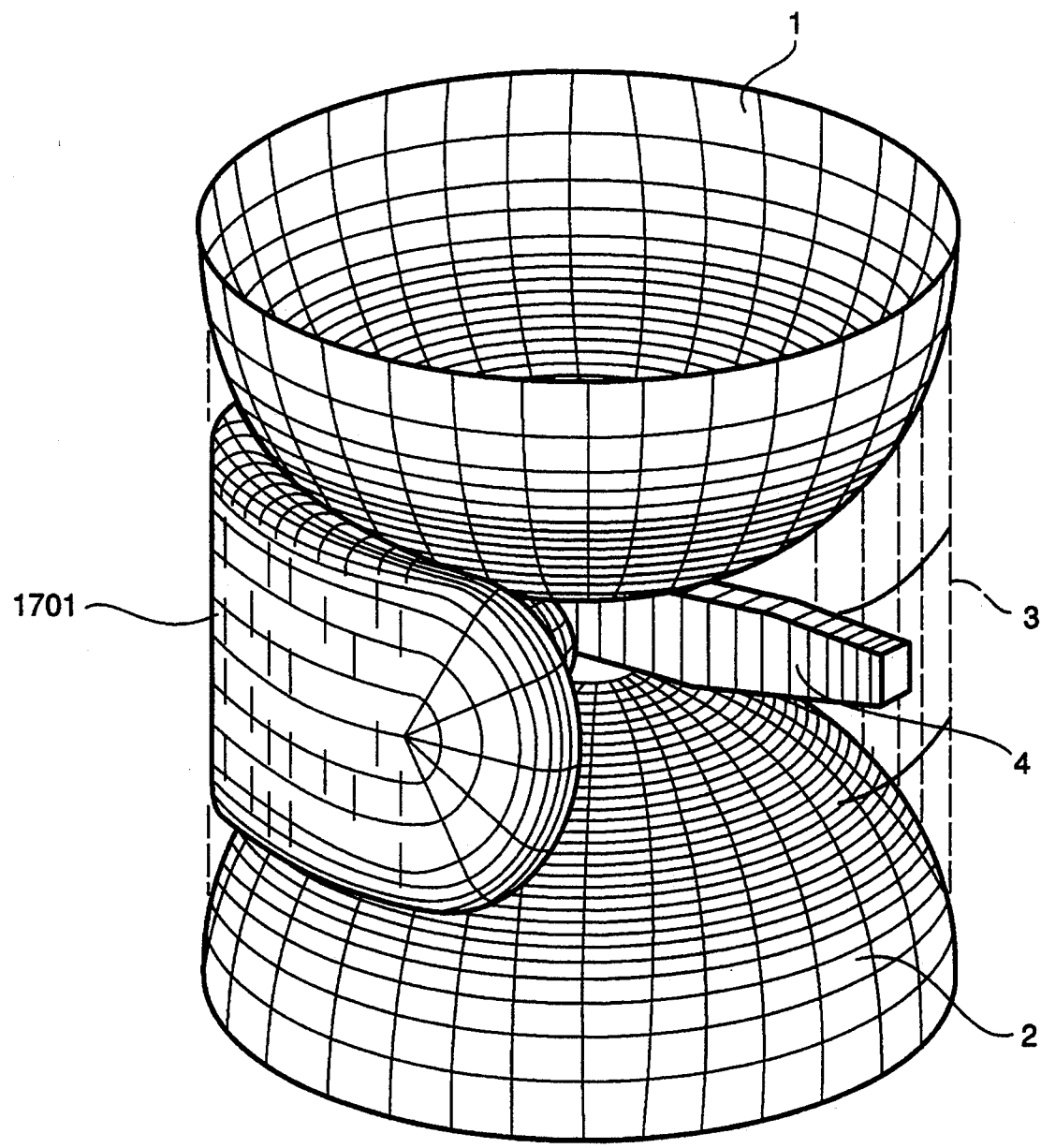

FIGS. 9–13 illustrate various views of the inflatable tunnel 901 located in the intertank space and its interconnection to the docking and airlock fixtures 902–904, the liquid oxygen pressure vessel 1, liquid hydrogen pressure vessel 2, and the pressure tunnel 108 to the orbiter vehicle 101. The inflatable tunnel 901 is constructed of an inflatable ruggedized fabric that can be deployed within intertank space 3 once orbit is achieved. Inflatable pressurized tunnel 901 is configured to avoid structural interference with the large box beam 4 as well as an oxygen propellant feed line 905 that connects the liquid oxygen propellant tank 1 with the orbiter vehicle main engines via the orbiter aft attachment apparatus 813. Inflatable tunnel 901 is also configured to avoid the annular ring frames 6 and longitudinal stringers 7 that comprise the structural framework of intertank structure 3. FIG. 9 is a cross-section view of the intertank structure 3 as viewed from the rear of external tank 102, while FIG. 10 is a cross-section view of the intertank structure 3 as viewed from above. FIG. 11 is a cross-section view of the intertank structure 3 as viewed from the side, while FIG. 12 is a cut-away perspective view of the intertank structure 3. FIG. 13 is a cross-section view of the intertank structure 3 as viewed from above, with emphasis on the clearances between the major structures contained therein. As can be seen from this series of Figures, with the arrow labeled F indicating the nose of external tank 102, docking and airlock fixtures 902-904 are distributed around the exterior diameter of intertank structure 3 in a manner to permit the concurrent docking of orbiter vehicle 101 and two other vehicles, such as visiting orbiter vehicle 111 (FIGS. 1-3). Pressurized tunnel 108 that is connected to orbiter vehicle 101 is an integral part of pressurizable tunnel 901 and provides a shirt-sleeve passage between the crew space in orbiter vehicle 101 and the intertank space. In FIGS. 9-13, access ports 906, 907 are illustrated as interconnecting pressurizable tunnel 901 with liquid oxygen pressure vessel 1 and liquid hydrogen pressure vessel 2. The liquid oxygen pressure vessel 1 and liquid hydrogen pressure vessel 2 are each equipped with manhole covers that can be removed to interconnect pressurizable tunnel 901 with these volumes. FIG. 16 is a perspective view of a pressurizable tunnel 1601 of toro-cylindrical form mounted within the intertank structure 3, while FIG. 17 illustrates an oblique toroid form of the pressurizable tunnel 1701. The intertank space 3 can be extended to provide additional pressurized volume without compromising the integrity of external tank 102.

Intertank Pallet

Figure 14:
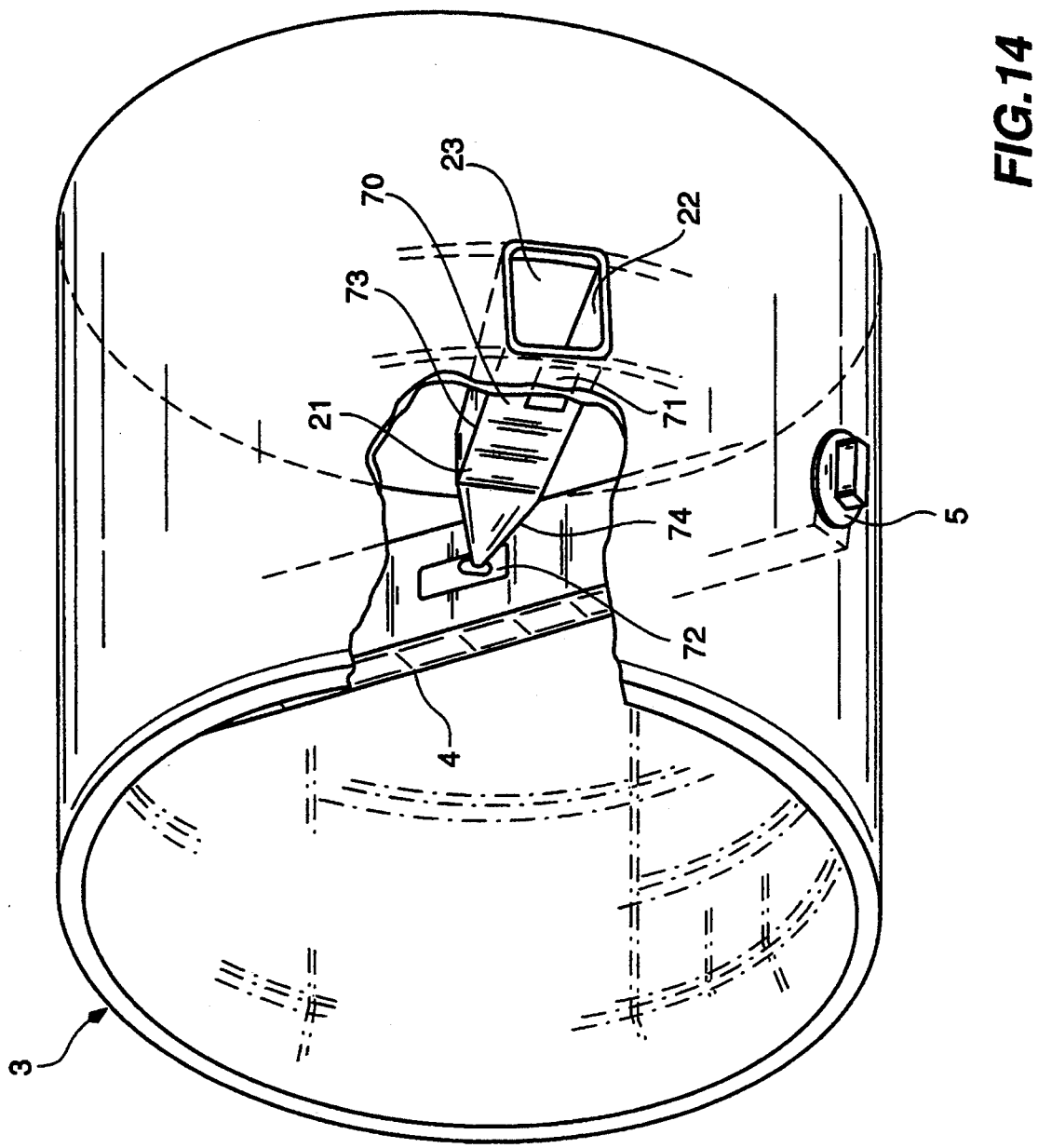
FIG. 14 illustrates a cutaway perspective view of the intertank with an installed pallet.
Figure 15:
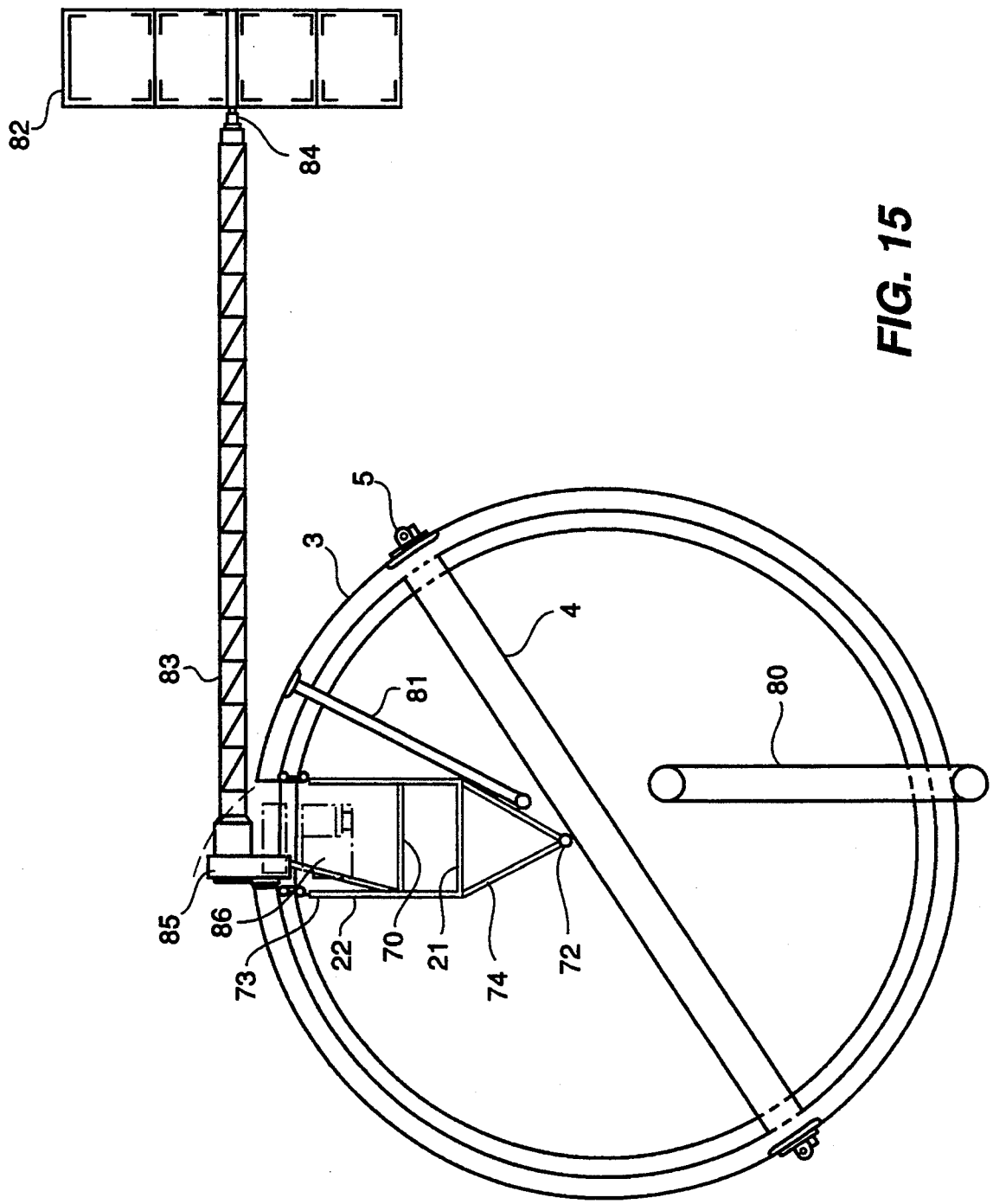
FIG. 15 illustrates a cross-section view of the intertank including a pallet with a deployable solar power system.

FIG. 14 illustrates a cut-away perspective view of the intertank structure 3 showing a large flush-mounted intertank door pallet connected to box beam 4, while FIG. 15 illustrates a cross-section view of the intertank structure 3 containing a pallet, taken at the level of the box beam 4 and parallel thereto. FIG. 15 includes pallet 85 carrying a solar panel array 30 in deployed configuration (solid lines) and payload configuration (dashed lines). Various names are used to describe a closure that seals a connecting port between the external and internal regions of the external tank 102. The term pallet is understood to refer to a structure that serves to mount an instrument or other apparatus as well as provide a closure that seals connecting port.

FIG. 14 illustrates the installation of a pallet and associated apparatus storage facility in the intertank structure 3. The top 23 of the pallet corresponds to the exterior door 8 of FIG. 7. The bottom 21 and sides 22 of the pallet provide an enclosure into which apparatus can be placed for deployment when the space station is in orbit. The lower section of the pallet is held firmly in place by attachment braces 74 angled to attach at a single mounting plate 72 bolted to box beam 4. An access door 71 can optionally be provided in one of the side walls 71 to enable crew member to access the apparatus prior to deployment. An optional bulkhead 73 can also be provided to divide the pallet space into two compartments. FIG. 15 illustrates an application of the pallet of FIG. 14, wherein a solar collector panel stored in the pallet during the initial flight. The payload is a foldable solar array 82 mounted on an extensible mast 83 by means of a single-axis gimbel 84 which allows the solar panels 82 to orient facing the sun to maximize solar energy collection. The extensible mast 83 is connected to housing 85 which serves both as a container for the extensible mast 83 when it is collapsed for storage and as a hinged base for connecting the solar collector to the pallet such that the folded solar collector and mast can be swung inwardly to be stowed within the pallet as shown by the dashed lines 86. This solar collector can be used in lieu of or to supplement the solar panels 105 illustrated in FIG. 1 as being deployed from the orbiter vehicle 101.

SUMMARY

The space station of the present invention makes use of a modified space shuttle orbiter vehicle to provide a pre-assembled pre-tested, modular space station. The modified orbiter vehicle has all the equipment needed for manned launch, re-entry and landing removed The modified orbiter vehicle carries a pressurized laboratory module, a solar power system, and docking apparatus. The modified orbiter vehicle provides instrumentation, attitude control, communications, and life support systems. Another configuration includes an external fuel tank permanently attached to the modified orbiter vehicle.

In either configuration, all equipment is fully integrated, installed and checked out on the ground before the launch in a single unmanned launch. The laboratory module can be heavier and longer than is possible in a standard shuttle space craft because of the elimination of some orbiter vehicle systems and since the center of gravity limitation at landing does not apply to the space station. A deployable solar panel system can also be carried in or beneath the orbiter vehicle cargo bay to provide power to the orbiter vehicle and its attached external tank. Many of the existing systems and capabilities of the shuttle orbiter vehicle are fully utilized in the space station. Other systems are modified to extend capacity or lifetime or to make them compatible with other space station systems. The carbon dioxide removal system and the environmental control system can be retained or modified to improve operational efficiency. The electrical power distribution and data management systems of the orbiter vehicle can, with minor modifications, be used for the space station and the shuttle orbiter vehicle air lock is retained as either the prime or backup mode of performing extra vehicular activity (EVA) along with all the necessary pressure suit and communication functions. The communication antennas built into the shuttle orbiter vehicle are used for wide band communication and the thermal radiators mounted on the cargo bay doors provide heat rejection capability for the space station. The existing remote manipulator system can be retained and used in berthing other modular external tanks, pallets or shuttle orbiter vehicle external tank combinations. Evolution of the space station to accommodate additional pressurized modules can be readily accomplished.

We claim:

1. A prefabricated space station comprising:
   a space shuttle orbiter vehicle, powered by rocket engines, having a cargo bay;
   habitable laboratory module means mounted in said cargo bay;
   an external fuel tank for containment of propellant materials for sid orbiter vehicle rocket engines;
   means for mounting said orbiter vehicle on a side of said external tank;
   means of dimensions to enable passage therethrough of a human being between said habitable space located within said orbiter vehicle and said habitable space located within said external tank; and means for connecting a habitable space located within said orbiter vehicle with said habitable space located within said laboratory module means.

2. The space station of claim 1 further comprising:
docking means for enabling the interconnection of said habitable space within said laboratory module means with a habitable space located within a space craft that is proximate to said space station.

3. The space station of claim 1 further comprising:
docking means for enabling the interconnection of said habitable space within said orbiter vehicle with a habitable space located within a space craft this is proximate to said space station.

4. The space station of claim 1 further comprising:
docking means for enabling the interconnection of said habitable space within said orbiter vehicle with a habitable space located within a space craft that is proximate to said space station.

5. The space station of claim 1 wherein said external tank habitable space connecting means comprises:
at least one pressurized tunnel constructed of inflatable ruggedized fabric and located within said external tank.

6. The space station of claim 1 further comprising:
docking means for enabling the interconnection of said habitable space within said external tank with a habitable space located within a space craft that is proximate to said space station.

7. The space station of claim 1 further comprising:
first pressure vessel means located within said external tank for containing a propellant of a first type; and means located within said external tank for providing access from said habitable space within said external tank to an interior of said first pressure vessel.

8. The space station of claim 7 further comprising:
second pressure vessel means located within said external tank for containing a propellant of a second type; and means located within said external tank for providing access from said habitable space within said external tank to an interior of said second pressure vessel.

9. The space station of claim 7 further comprising:
second pressure vessel means located within said external tank for containing a propellant of a second type; and wherein said habitable space is located between said first and said second pressure vessels;

means for providing access from said habitable space within said external tank to an interior of said second pressure vessel.

10. The space station of claim 1 further comprising:
first pressure vessel means located within said external tank for containing a propellant of a first type;

second pressure vessel means located within said external tank, juxtaposed to said first pressure vessel, for containing a propellant of a second type; and means, located juxtaposed to said second pressure vessel at an end of said second pressure vessel distal from said first pressure vessel, for providing habitable space within said external tank.

11. The space station of claim 10 further comprising:
means, located within said external tank, for providing access from said means for providing habitable space to an interior of said second pressure vessel.

12. The space station of claim 1 wherein said connecting means comprises:
pressurized tunnel means of dimensions to enable passage therethrough of a human being between said habitable space located within said orbiter vehicle and said habitable space located within said external tank.

13. The space station of claim 12 wherein said connecting means further comprises:
means for permanently interconnecting said orbiter vehicle to said external tank.

14. The space station of claim 1 further comprising:
at least one booster rocket detachably mounted on a side of said external tank for providing propulsion to said space station during initial launch.

15. The space station of claim 1 further comprising:
first booster rocket means, detachably connected to a side of said external tank, for providing propulsion to said space station during initial launch;

second booster rocket means, detachably connected to a side of said external tank, for providing propulsion to said space station during initial launch; and wherein said first and second booster rocket means are mounted in a parallel spaced apart relationship, on opposite sides of said external tank.

16. The space station of claim 1 wherein said orbiter vehicle comprises a reusable space shuttle having life support, guidance and communications apparatus and wherein said orbiter vehicle life support apparatus provides life support to said habitable space in said external tank.

17. The space station of claim 1 wherein said orbiter vehicle further comprises:
photovoltaic converter means for generating electric power for said space station.

18. A prefabricated space station comprising:
an orbiter vehicle having rocket engines;
an external tank for containment of propellant materials for sid orbiter vehicle rocket engines;
means for mounting said orbiter vehicle on a side of said external tank; and
means for connecting a habitable space within said orbiter vehicle with a habitable space located within said external tank, comprising:
a pressurized tunnel of dimensions to enable passage therethrough of a human being between said habitable space located within said orbiter vehicle and said habitable space located within said external tank.

19. The space station of claim 18 further comprising:
first pressure vessel means located within said external tank for containing a propellant of a first type; and means located within said external tank for providing access from said habitable space within said external tank to an interior of said first pressure vessel.

20. The space station of claim 19 further comprising:
second pressure vessel means located within said external tank for containing a propellant of a second type; and means located within said external tank for providing access from said habitable space within said external tank to an interior of said second pressure vessel.

21. The space station of claim 19 further comprising:

second pressure vessel means located within said external tank for containing a propellant of a second type; and wherein said habitable space is located between said first and said second pressure vessels, said access providing means provides access from said habitable space within said external tank to an interior of said second pressure vessel.

22. The space station of claim 18 further comprising:
first pressure vessel means located within said external tank for containing a propellant of a first type;
second pressure vessel means located within said external tank, juxtaposed to said first pressure vessel, for containing a propellant of a second type; and
means, located juxtaposed to said second pressure vessel at an end of said second pressure vessel distal from said first pressure vessel, for providing habitable space within said external tank.

23. The space station of claim 22 further comprising:
means located within said external tank for providing access from said means for providing habitable space to an interior of said second pressure vessel.

24. The space station of claim 18 further comprising:
docking means for enabling the interconnection of said habitable space within said external tank with a habitable space located within a space craft that is proximate to said space station.

25. The space station of claim 18 further comprising:
at least one booster rocket detachably mounted on a side of said external tank for providing propulsion to said space station during initial launch.

26. The space station of claim 18 wherein said connecting means further comprises:
means for permanently interconnecting said orbiter vehicle to said external tank.

27. The space station of claim 18 wherein said orbiter vehicle comprises a reusable space shuttle having life support, guidance and communications apparatus.

28. The space station of claim 27 wherein said orbiter vehicle is absent operational landing avionics.

29. The space station of claim 27 wherein said orbiter vehicle life support apparatus provides life support to said habitable space in said external tank.

30. The space station of claim 27 wherein said orbiter vehicle further comprises:
solar collector means for generating electric power; and
means for distributing said generated electric power to said habitable space in said external tank.

31. The space station of claim 18 further comprising:
first booster rocket means, detachably connected to a side of said external tank, for providing propulsion to said space station during initial launch;
second booster rocket means, detachably connected to a side of said external tank, for providing propulsion to said space station during initial launch; and
wherein said first and second booster rocket means are mounted in a parallel spaced apart relationship, on opposite sides of said external tank.

32. The space station of claim 18, wherein said orbiter vehicle includes a cargo bay, further comprising:
habitable laboratory module means mounted in said cargo bay; and
means for connecting a habitable space located within said orbiter vehicle with a habitable space located within said laboratory module means.

33. The space station of claim 32 further comprising:
docking means for enabling the interconnection of said habitable space within said laboratory module means with a habitable space located within a space craft that is proximate to said space station.

* * * * *